(12) United States Patent
Corbin

(10) Patent No.: US 6,271,808 B1
(45) Date of Patent: Aug. 7, 2001

(54) STEREO HEAD MOUNTED DISPLAY USING A SINGLE DISPLAY DEVICE

(75) Inventor: Dave B. Corbin, Los Altos Hills, CA (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 09/092,245

(22) Filed: Jun. 5, 1998

(51) Int. Cl.[7] ....................................................... G09G 5/00
(52) U.S. Cl. .................................................. 345/7; 345/8
(58) Field of Search ....................... 345/7–8; 359/630–631

(56) References Cited

U.S. PATENT DOCUMENTS

| | | |
|---|---|---|
| Re. 16,767 | 10/1927 | Jenkins . |
| Re. 25,169 | 5/1962 | Glenn . |
| 1,525,550 | 2/1925 | Jenkins . |
| 1,548,262 | 8/1925 | Freedman . |
| 1,814,701 | 7/1931 | Ives . |
| 2,415,226 | 2/1947 | Sziklai .................................. 178/5.4 |
| 2,783,406 | 2/1957 | Vanderhooft ......................... 313/70 |
| 2,991,690 | 7/1961 | Grey et al. ............................ 88/16.6 |
| 3,553,364 | 1/1971 | Lee ...................................... 178/7.3 |
| 3,576,394 | 4/1971 | Lee ...................................... 178/7.3 |
| 3,600,798 | 8/1971 | Lee ...................................... 29/592 |

(List continued on next page.)

FOREIGN PATENT DOCUMENTS

| | | | |
|---|---|---|---|
| 0 261 901 A2 | 3/1988 | (EP) | ................................ G09G/3/36 |
| 0 627 644 A3 | 9/1990 | (EP) | ............................. G02B/27/00 |
| 0 417 039 A1 | 3/1991 | (EP) | ............................. G03B/21/20 |

(List continued on next page.)

OTHER PUBLICATIONS

R. Apte, F. Sandejas, W. Banyai, D. Bloom, "Grating Light Valves For High Resolution Displays", Ginzton Laboratories, Stanford University, Stanford, CA 94305–4085, Jun., 1994.

R. Apte, "Grating Light Valves For High Resolution Displays," Jun., 1994.

O. Solgaard, "Integrated Semiconductor Light Modulators For Fiber–Optic And Display Applications," Feb., 1992.

(List continued on next page.)

Primary Examiner—Richard Hjerpe
Assistant Examiner—Duc Q. Dinh
(74) Attorney, Agent, or Firm—Haverstock & Owens LLP (57) ABSTRACT

A single display device is mounted within a head-worn apparatus to produce both a left image and a right image. The left image is directed to a right eye of the user, and the right image is directed to the left eye of the user. When in the stereoscopic mode, the right and left images differ from each other such that when viewed by the user, the combined right and left images give the user a stereoscopic, three-dimensional effect. When worn on the head of the user, the device is properly aligned to provide the left image to the right eye and the right image to the left eye. Further, as the user moves, the present invention remains properly aligned such that the user can continue viewing the left image with the right eye and the right image with the left eye independent of movement by the user so long as the user keeps wearing the device. A plurality of pixels are collected as the display, wherein each pixel is formed of a grating light valve. The modulation of light by the grating light valve is configured to be accomplished sequentially and also sufficiently fast to multiplex both complete right and left images in a single time frame thereby preventing flicker. By using a single display, the device is inherently aligned to produce an accurate right and left images viewed by each respective eye without internal adjustments. Further, by using the grating light valve, the user is only exposed to reflected light rather than to harmful radiation such as from a cathode ray tube. Additionally, forming the display of grating light valves allows formation of two images without the use of any filters owing to the speed of grating light valves.

38 Claims, 3 Drawing Sheets

U.S. PATENT DOCUMENTS

| | | | |
|---|---|---|---|
| 3,656,837 | 4/1972 | Sandbank | 350/161 |
| 3,802,769 | 4/1974 | Rotz et al. | 352/43 |
| 3,886,310 | 5/1975 | Guldberg et al. | 178/7.5 D |
| 3,896,338 | 7/1975 | Nathanson et al. | 315/373 |
| 3,935,499 | 1/1976 | Oess | 313/413 |
| 3,935,500 | 1/1976 | Oess et al. | 313/495 |
| 3,947,105 | 3/1976 | Smith | 353/121 |
| 3,969,611 | 7/1976 | Fonteneau | 219/502 |
| 4,001,663 | 1/1977 | Bray | 321/2 |
| 4,009,939 | 3/1977 | Okano | 350/162 SF |
| 4,012,116 | 3/1977 | Yevick | 350/132 |
| 4,017,158 | 4/1977 | Booth | 350/162 SF |
| 4,020,381 | 4/1977 | Oess et al. | 313/302 |
| 4,067,129 | 1/1978 | Abramson et al. | 40/563 |
| 4,084,437 | 4/1978 | Finnegan | 73/361 |
| 4,093,346 | 6/1978 | Nishino et al. | 350/162 SF |
| 4,093,921 | 6/1978 | Buss | 325/459 |
| 4,093,922 | 6/1978 | Buss | 325/459 |
| 4,127,322 | 11/1978 | Jacobson et al. | 353/31 |
| 4,135,502 | 1/1979 | Peck | 128/76.5 |
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,185,891 | 1/1980 | Kaestner | 350/167 |
| 4,211,918 | 7/1980 | Nyfeler et al. | 235/454 |
| 4,223,050 | 9/1980 | Nyfeler et al. | 427/163 |
| 4,225,913 | 9/1980 | Bray | 363/97 |
| 4,250,217 | 2/1981 | Greenaway | 428/161 |
| 4,250,393 | 2/1981 | Greenaway | 250/566 |
| 4,256,787 | 3/1981 | Shaver et al. | 428/1 |
| 4,327,411 | 4/1982 | Turner | 364/900 |
| 4,327,966 | 5/1982 | Bloom | 350/162 R |
| 4,338,660 | 7/1982 | Kelley et al. | 364/200 |
| 4,361,384 | 11/1982 | Bosserman | 350/174 |
| 4,408,884 | 10/1983 | Kleinknecht et al. | 356/355 |
| 4,418,397 | 11/1983 | Brantingham et al. | 364/900 |
| 4,420,717 | 12/1983 | Wallace et al. | 318/696 |
| 4,430,584 | 2/1984 | Someshwar et al. | 307/465 |
| 4,440,839 | 4/1984 | Mottier | 430/2 |
| 4,443,819 | 4/1984 | Funada et al. | 358/236 |
| 4,443,845 | 4/1984 | Hamilton et al. | 364/200 |
| 4,447,881 | 5/1984 | Brantingham et al. | 364/488 |
| 4,454,591 | 6/1984 | Lou | 364/900 |
| 4,468,725 | 8/1984 | Venturini | 363/160 |
| 4,484,188 | 11/1984 | Ott | 340/728 |
| 4,492,435 | 1/1985 | Banton et al. | 350/360 |
| 4,503,494 | 3/1985 | Hamilton et al. | 364/200 |
| 4,556,378 | 12/1985 | Nyfeler et al. | 425/143 |
| 4,561,044 | 12/1985 | Ogura et al. | 362/84 |
| 4,566,935 | 1/1986 | Hornbeck | 156/626 |
| 4,571,041 | 2/1986 | Gaudyn | 353/10 |
| 4,571,603 | 2/1986 | Hornbeck et al. | 346/160 |
| 4,590,548 | 5/1986 | Maytum | 363/161 |
| 4,594,501 | 6/1986 | Culley et al. | 219/492 |
| 4,596,992 | 6/1986 | Hornbeck | 346/76 PH |
| 4,615,595 | 10/1986 | Hornbeck | 353/122 |
| 4,623,219 | 11/1986 | Trias | 350/351 |
| 4,636,866 | 1/1987 | Hattori | 358/236 |
| 4,645,881 | 2/1987 | LeToumelin et al. | 379/252 |
| 4,646,158 | 2/1987 | Ohno et al. | 358/236 |
| 4,652,932 | 3/1987 | Miyajima et al. | 358/236 |
| 4,655,539 | 4/1987 | Caulfield et al. | 350/36 |
| 4,662,746 | 5/1987 | Hornbeck | 350/269 |
| 4,663,670 | 5/1987 | Ito et al. | 358/245 |
| 4,709,995 | 12/1987 | Kuribayashi et al. | 350/350 S |
| 4,710,732 | 12/1987 | Hornbeck | 332/7.51 |
| 4,714,326 | 12/1987 | Usui et al. | 350/485 |
| 4,719,507 | 1/1988 | Bos | 358/92 |
| 4,722,593 | 2/1988 | Shimazaki | 350/336 |
| 4,728,185 | 3/1988 | Thomas | 353/122 |
| 4,744,633 | 5/1988 | Sheiman | 350/132 |
| 4,747,671 | 5/1988 | Takahashi et al. | 350/336 |
| 4,751,509 | 6/1988 | Kubota et al. | 340/784 |
| 4,761,253 | 8/1988 | Antes | 264/1.3 |
| 4,772,094 | 9/1988 | Sheiman | 350/133 |
| 4,803,560 | 2/1989 | Matsunaga et al. | 358/236 |
| 4,807,965 | 2/1989 | Garakani | 350/131 |
| 4,809,078 | 2/1989 | Yabe et al. | 358/236 |
| 4,811,210 | 3/1989 | McAulay | 364/200 |
| 4,814,759 | 3/1989 | Gombrich et al. | 340/771 |
| 4,827,391 | 5/1989 | Sills | 363/41 |
| 4,829,365 | 5/1989 | Eichenlaub | 358/3 |
| 4,856,863 | 8/1989 | Sampsell et al. | 350/96.16 |
| 4,856,869 | 8/1989 | Sakata et al. | 350/162.18 |
| 4,859,012 | 8/1989 | Cohn | 350/96.24 |
| 4,866,488 | 9/1989 | Frensley | 357/4 |
| 4,915,463 | 4/1990 | Barbee, Jr. | 350/1.1 |
| 4,915,479 | 4/1990 | Clarke | 350/345 |
| 4,934,773 | 6/1990 | Becker | 350/6.6 |
| 4,952,925 | 8/1990 | Haastert | 340/784 |
| 4,954,789 | 9/1990 | Sampsell | 330/4.3 |
| 4,956,619 | 9/1990 | Hornbeck | 330/4.3 |
| 4,978,202 | 12/1990 | Yang | 350/331 R |
| 4,982,184 | 1/1991 | Kirkwood | 340/783 |
| 4,984,824 | 1/1991 | Antes et al. | 283/91 |
| 5,003,300 | 3/1991 | Wells | 340/705 |
| 5,013,141 | 5/1991 | Sakata | 350/348 |
| 5,018,256 | 5/1991 | Hornbeck | 29/25.01 |
| 5,022,750 | 6/1991 | Flasck | 353/31 |
| 5,024,494 | 6/1991 | Williams et al. | 350/3.6 |
| 5,028,939 | 7/1991 | Hornbeck et al. | 346/160 |
| 5,035,473 | 7/1991 | Kuwayama et al. | 350/3.7 |
| 5,037,173 | 8/1991 | Sampsell et al. | 385/17 |
| 5,041,851 | 8/1991 | Nelson | 346/160 |
| 5,048,077 | 9/1991 | Wells et al. | 379/96 |
| 5,058,992 | 10/1991 | Takahashi | 359/567 |
| 5,060,058 | 10/1991 | Goldenberg et al. | 358/60 |
| 5,061,049 | 10/1991 | Hornbeck | 359/224 |
| 5,072,239 | 12/1991 | Mitcham et al. | 346/108 |
| 5,072,418 | 12/1991 | Boutaud et al. | 364/715.06 |
| 5,079,544 | 1/1992 | DeMond et al. | 340/701 |
| 5,083,857 | 1/1992 | Hornbeck | 359/291 |
| 5,089,903 | 2/1992 | Kuwayama et al. | 359/15 |
| 5,096,279 | 3/1992 | Hornbeck et al. | 359/230 |
| 5,099,353 | 3/1992 | Hornbeck | 359/291 |
| 5,101,184 | 3/1992 | Antes | 235/454 |
| 5,101,236 | 3/1992 | Nelson et al. | 355/229 |
| 5,105,207 | 4/1992 | Nelson | 346/160 |
| 5,105,299 | 4/1992 | Anderson et al. | 359/223 |
| 5,105,369 | 4/1992 | Nelson | 364/525 |
| 5,113,272 | 5/1992 | Reamey | 359/53 |
| 5,113,285 | 5/1992 | Franklin et al. | 359/465 |
| 5,119,204 | 6/1992 | Hashimoto et al. | 358/254 |
| 5,121,343 | 6/1992 | Faris | 395/111 |
| 5,128,660 | 7/1992 | DeMond et al. | 340/707 |
| 5,129,716 | 7/1992 | Holakovszky et al. | 351/50 |
| 5,132,812 | 7/1992 | Takahashi et al. | 359/9 |
| 5,142,303 | 8/1992 | Nelson | 346/108 |
| 5,142,405 | 8/1992 | Hornbeck | 359/226 |
| 5,142,677 | 8/1992 | Ehlig et al. | 395/650 |
| 5,148,157 | 9/1992 | Florence | 340/783 |
| 5,148,506 | 9/1992 | McDonald | 385/16 |
| 5,151,718 | 9/1992 | Nelson | 346/160 |
| 5,155,604 | 10/1992 | Miekka et al. | 359/2 |
| 5,155,615 | 10/1992 | Tagawa | 359/213 |
| 5,155,778 | 10/1992 | Magel et al. | 385/18 |
| 5,155,812 | 10/1992 | Ehlig et al. | 395/275 |
| 5,159,485 | 10/1992 | Nelson | 359/291 |
| 5,161,042 | 11/1992 | Hamada | 359/41 |
| 5,162,787 | 11/1992 | Thompson et al. | 340/794 |
| 5,165,013 | 11/1992 | Faris | 395/104 |

| | | | | | | | |
|---|---|---|---|---|---|---|---|
| 5,168,406 | 12/1992 | Nelson | 359/855 | 5,339,116 | 8/1994 | Urbanus et al. | 348/716 |
| 5,170,156 | 12/1992 | DeMond et al. | 340/794 | 5,345,521 | 9/1994 | McDonald et al. | 385/19 |
| 5,170,269 | 12/1992 | Lin et al. | 359/9 | 5,347,321 | 9/1994 | Gove | 348/663 |
| 5,170,283 | 12/1992 | O'Brien et al. | 359/291 | 5,347,378 | 9/1994 | Handschy et al. | 359/53 |
| 5,172,161 | 12/1992 | Nelson | 355/200 | 5,347,433 | 9/1994 | Sedlmayr | 362/32 |
| 5,172,262 | 12/1992 | Hornbeck | 359/223 | 5,348,619 | 9/1994 | Bohannon et al. | 156/664 |
| 5,178,728 | 1/1993 | Boysel et al. | 156/656 | 5,349,687 | 9/1994 | Ehlig et al. | 395/800 |
| 5,179,274 | 1/1993 | Sampsell | 250/208.2 | 5,351,052 | 9/1994 | D'Hont et al. | 342/42 |
| 5,179,367 | 1/1993 | Shimizu | 340/700 | 5,357,369 | 10/1994 | Pilling et al. | 359/462 |
| 5,181,231 | 1/1993 | Parikh et al. | 377/26 | 5,359,349 | 10/1994 | Jambor et al. | 345/168 |
| 5,182,665 | 1/1993 | O'Callaghan et al. | 359/95 | 5,363,220 | 11/1994 | Kuwayama et al. | 359/3 |
| 5,192,946 | 3/1993 | Thompson et al. | 340/794 | 5,365,283 | 11/1994 | Doherty et al. | 348/743 |
| 5,198,895 * | 3/1993 | Vick | 348/115 | 5,367,585 | 11/1994 | Ghezzo et al. | 385/23 |
| 5,202,785 | 4/1993 | Nelson | 359/214 | 5,371,543 | 12/1994 | Anderson | 348/270 |
| 5,206,629 | 4/1993 | DeMond et al. | 340/719 | 5,371,618 | 12/1994 | Tai et al. | 359/53 |
| 5,212,555 | 5/1993 | Stoltz | 358/206 | 5,382,961 | 1/1995 | Gale, Jr. | 345/108 |
| 5,212,582 | 5/1993 | Nelson | 359/224 | 5,387,924 | 2/1995 | Gale, Jr. et al. | 345/108 |
| 5,214,419 | 5/1993 | DeMond et al. | 340/794 | 5,389,182 | 2/1995 | Mignardi | 156/344 |
| 5,214,420 | 5/1993 | Thompson et al. | 340/795 | 5,392,140 | 2/1995 | Ezra et al. | 359/41 |
| 5,216,537 | 6/1993 | Hornbeck | 359/291 | 5,392,151 | 2/1995 | Nelson | 359/223 |
| 5,221,982 | 6/1993 | Faris | 359/93 | 5,398,071 | 3/1995 | Gove et al. | 348/558 |
| 5,226,099 | 7/1993 | Mignardi et al. | 385/19 | 5,410,315 | 4/1995 | Huber | 342/42 |
| 5,231,363 | 7/1993 | Sano et al. | 332/109 | 5,411,769 | 5/1995 | Hornbeck | 427/534 |
| 5,231,388 | 7/1993 | Stoltz | 340/783 | 5,412,186 | 5/1995 | Gale | 219/679 |
| 5,231,432 | 7/1993 | Glenn | 353/31 | 5,418,584 | 5/1995 | Larson | 353/122 |
| 5,233,456 | 8/1993 | Nelson | 359/214 | 5,420,655 | 5/1995 | Shimizu | 353/33 |
| 5,237,340 | 8/1993 | Nelson | 346/108 | 5,430,524 | 7/1995 | Nelson | 355/200 |
| 5,237,435 | 8/1993 | Kurematsu et al. | 359/41 | 5,435,876 | 7/1995 | Alfaro et al. | 156/247 |
| 5,240,818 | 8/1993 | Mignardi et al. | 430/321 | 5,442,411 | 8/1995 | Urbanus et al. | 348/771 |
| 5,245,686 | 9/1993 | Faris et al. | 385/120 | 5,442,414 | 8/1995 | Janssen et al. | 353/98 |
| 5,247,180 | 9/1993 | Mitcham et al. | 250/492.1 | 5,444,566 | 8/1995 | Gale et al. | 359/291 |
| 5,247,593 | 9/1993 | Lin et al. | 385/17 | 5,445,559 | 8/1995 | Gale et al. | 451/388 |
| 5,254,980 | 10/1993 | Hendrix et al. | 345/84 | 5,446,479 | 8/1995 | Thompson et al. | 345/139 |
| 5,255,100 | 10/1993 | Urbanus | 358/231 | 5,447,600 | 9/1995 | Webb | 216/2 |
| 5,256,869 | 10/1993 | Lin et al. | 250/201.9 | 5,448,314 | 9/1995 | Heimbuch et al. | 348/743 |
| 5,262,000 | 11/1993 | Wellbourn et al. | 156/643 | 5,448,546 | 9/1995 | Pauli | 369/112 |
| 5,272,473 | 12/1993 | Thompson et al. | 345/7 | 5,450,088 | 9/1995 | Meier et al. | 342/51 |
| 5,278,652 | 1/1994 | Urbanus et al. | 358/160 | 5,450,219 | 9/1995 | Gold et al. | 359/40 |
| 5,278,925 | 1/1994 | Boysel et al. | 385/14 | 5,451,103 | 9/1995 | Hatanaka et al. | 353/31 |
| 5,280,277 | 1/1994 | Hornbeck | 345/108 | 5,452,024 | 9/1995 | Sampsell | 348/755 |
| 5,281,957 | 1/1994 | Schoolman | 345/8 | 5,452,138 | 9/1995 | Mignardi et al. | 359/855 |
| 5,285,196 | 2/1994 | Gale, Jr. | 345/108 | 5,453,747 | 9/1995 | D'Hont et al. | 342/42 |
| 5,285,407 | 2/1994 | Gale et al. | 365/189.11 | 5,453,778 | 9/1995 | Venkateswar et al. | 347/239 |
| 5,287,096 | 2/1994 | Thompson et al. | 345/147 | 5,453,803 | 9/1995 | Shapiro et al. | 353/119 |
| 5,287,215 | 2/1994 | Warde et al. | 359/293 | 5,454,906 | 10/1995 | Baker et al. | 216/66 |
| 5,289,172 | 2/1994 | Gale, Jr. et al. | 345/108 | 5,455,602 | 10/1995 | Tew | 347/239 |
| 5,291,317 | 3/1994 | Newswanger | 359/15 | 5,457,493 | 10/1995 | Leddy et al. | 348/164 |
| 5,291,473 | 3/1994 | Pauli | 369/112 | 5,457,566 | 10/1995 | Sampsell et al. | 359/292 |
| 5,293,511 | 3/1994 | Poradish et al. | 257/434 | 5,458,716 | 10/1995 | Alfaro et al. | 156/245 |
| 5,296,950 | 3/1994 | Lin et al. | 359/9 | 5,459,492 | 10/1995 | Venkateswar | 347/253 |
| 5,299,037 | 3/1994 | Sakata | 359/41 | 5,459,528 | 10/1995 | Pettitt | 348/568 |
| 5,299,289 | 3/1994 | Omae et al. | 359/95 | 5,459,592 | 10/1995 | Shibatani et al. | 359/40 |
| 5,301,062 | 4/1994 | Takahashi et al. | 359/567 | 5,459,610 | 10/1995 | Bloom et al. | 359/572 |
| 5,303,055 | 4/1994 | Hendrix et al. | 348/761 | 5,461,410 | 10/1995 | Venkateswar et al. | 347/240 |
| 5,307,056 | 4/1994 | Urbanus | 340/189 | 5,461,411 | 10/1995 | Florence et al. | 347/240 |
| 5,307,185 | 4/1994 | Jones et al. | 359/41 | 5,461,547 | 10/1995 | Ciupke et al. | 362/31 |
| 5,311,349 | 5/1994 | Anderson | 359/223 | 5,463,347 | 10/1995 | Jones et al. | 330/253 |
| 5,311,360 * | 5/1994 | Bloom et al. | 359/372 | 5,465,175 | 11/1995 | Woodgate et al. | 359/463 |
| 5,312,513 | 5/1994 | Florence et al. | 156/643 | 5,467,106 | 11/1995 | Salomon | 345/87 |
| 5,313,479 | 5/1994 | Florence | 372/26 | 5,467,138 | 11/1995 | Gove | 348/462 |
| 5,313,648 | 5/1994 | Ehlig et al. | 395/800 | 5,467,146 | 11/1995 | Huang et al. | 348/743 |
| 5,315,418 | 5/1994 | Sprague et al. | 359/41 | 5,469,302 | 11/1995 | Lim | 359/846 |
| 5,319,214 | 6/1994 | Gregory et al. | 250/504 R | 5,481,118 | 1/1996 | Tew | 250/551 |
| 5,319,789 | 6/1994 | Ehlig et al. | 395/800 | 5,482,564 | 1/1996 | Douglas et al. | 134/18 |
| 5,319,792 | 6/1994 | Ehlig et al. | 395/800 | 5,482,818 | 1/1996 | Nelson | 430/394 |
| 5,321,416 | 6/1994 | Bassett et al. | 345/8 | 5,483,307 | 1/1996 | Anderson | 353/98 |
| 5,323,002 | 6/1994 | Sampsell et al. | 250/252.1 | 5,485,172 | 1/1996 | Sawachika et al. | 345/8 |
| 5,325,116 | 6/1994 | Sampsell | 346/108 | 5,485,304 | 1/1996 | Kaeriyama | 359/291 |
| 5,327,286 | 7/1994 | Sampsell et al. | 359/561 | 5,485,354 | 1/1996 | Ciupke et al. | 362/31 |
| 5,330,878 | 7/1994 | Nelson | 430/311 | 5,486,698 | 1/1996 | Hanson et al. | 250/332 |
| 5,331,454 | 7/1994 | Hornbeck | 359/224 | 5,486,841 | 1/1996 | Hara et al. | 345/8 |

| | | | |
|---|---|---|---|
| 5,486,946 | 1/1996 | Jachimowicz et al. | 359/263 |
| 5,488,431 | 1/1996 | Gove et al. | 348/716 |
| 5,489,952 | 2/1996 | Gove et al. | 348/771 |
| 5,490,009 | 2/1996 | Venkateswar et al. | 359/291 |
| 5,491,510 | 2/1996 | Gove | 348/77 |
| 5,491,715 | 2/1996 | Flaxl | 375/344 |
| 5,493,439 | 2/1996 | Engle | 359/292 |
| 5,497,172 | 3/1996 | Doherty et al. | 345/85 |
| 5,497,197 | 3/1996 | Gove et al. | 348/388 |
| 5,497,262 | 3/1996 | Kaeriyama | 359/223 |
| 5,499,060 | 3/1996 | Gove et al. | 348/651 |
| 5,499,062 | 3/1996 | Urbanus | 348/771 |
| 5,500,761 | 3/1996 | Goossen et al. | 359/290 |
| 5,502,481 | 3/1996 | Dentinger et al. | 348/51 |
| 5,504,504 | 4/1996 | Markandey et al. | 345/214 |
| 5,504,514 | 4/1996 | Nelson | 347/130 |
| 5,504,575 | 4/1996 | Stafford | 356/330 |
| 5,504,614 | 4/1996 | Webb et al. | 359/223 |
| 5,506,171 | 4/1996 | Leonard et al. | 437/187 |
| 5,506,597 | 4/1996 | Thompson et al. | 345/85 |
| 5,506,720 | 4/1996 | Yoon | 359/224 |
| 5,508,750 | 4/1996 | Hewlett et al. | 348/558 |
| 5,508,840 | 4/1996 | Vogel et al. | 359/291 |
| 5,508,841 | 4/1996 | Lin et al. | 359/318 |
| 5,510,824 | 4/1996 | Nelson | 347/239 |
| 5,512,374 | 4/1996 | Wallace et al. | 428/422 |
| 5,512,748 | 4/1996 | Hanson | 250/332 |
| 5,515,076 | 5/1996 | Thompson et al. | 345/139 |
| 5,516,125 | 5/1996 | McKenna | 279/3 |
| 5,517,340 | 5/1996 | Doany et al. | 359/41 |
| 5,517,347 | 5/1996 | Sampsell | 359/224 |
| 5,517,359 | 5/1996 | Gelbart | 359/623 |
| 5,519,450 | 5/1996 | Urbanus et al. | 348/600 |
| 5,523,803 | 6/1996 | Urbanus et al. | 348/771 |
| 5,523,878 | 6/1996 | Wallace et al. | 359/290 |
| 5,523,881 | 6/1996 | Florence et al. | 359/561 |
| 5,524,155 | 6/1996 | Weaver | 385/24 |
| 5,539,422 | 7/1996 | Heacock et al. | 345/8 |
| 5,612,708 * | 3/1997 | Ansley et al. | 345/8 |
| 5,712,649 * | 1/1998 | Tosaki | 345/8 |
| 5,742,373 | 4/1998 | Alvelda | 349/204 |
| 5,886,675 * | 3/1999 | Aye et al. | 348/51 |
| 5,892,505 * | 4/1999 | Troppr et al. | 345/8 |
| 5,903,243 * | 5/1999 | Jones | 345/7 |
| 5,903,395 * | 5/1999 | Rallison et al. | 359/630 |
| 5,926,318 * | 7/1999 | Hebert | 359/630 |
| 5,949,390 * | 7/1999 | Nomura et al. | 348/54 |
| 5,982,553 | 11/1999 | Bloom et al | 359/627 |
| 6,061,489 * | 5/2000 | Ezra et al. | 385/115 |
| 6,097,352 * | 8/2000 | Zavracky et al. | 345/7 |

FOREIGN PATENT DOCUMENTS

| | | | |
|---|---|---|---|
| 0 477 566 A2 | 4/1992 | (EP) | G02B/26/08 |
| 0 488 326 A3 | 6/1992 | (EP) | G09G/3/28 |
| 0 530 760 A2 | 3/1993 | (EP) | G09G/3/34 |
| 0 610 665 A1 | 8/1994 | (EP) | G09G/3/34 |
| 0 627 644 A2 | 12/1994 | (EP) | G02B/27/00 |
| 0 627 850 A1 | 12/1994 | (EP) | H04N/5/64 |
| 0 643 314 A2 | 3/1995 | (EP) | G02B/27/00 |
| 0 654 777 A1 | 5/1995 | (EP) | G09G/3/34 |
| 0 658 868 A1 | 6/1995 | (EP) | G09G/3/34 |
| 2 118 365 | 10/1983 | (GB) | H01L/27/13 |
| 2 266 385 | 10/1993 | (GB) | G02B/23/10 |
| 2296152 | 6/1996 | (GB) | H04N/13/04 |
| 2319424 | 5/1998 | (GB) | H04N/13/04 |
| 63-305323 | 12/1988 | (JP) | G02F/1/13 |
| 2-219092 | 8/1990 | (JP) | G09G/3/28 |
| WO 92/12506 | 7/1992 | (WO) | G09F/9/37 |
| WO 93/02269 | 2/1993 | (WO) | E06B/5/10 |
| WO 93/09472 | 5/1993 | (WO) | G03F/7/20 |
| WO 93/18428 | 9/1993 | (WO) | G02B/27/00 |
| WO 9429761 | 12/1994 | (WO) | G02B/27/24 |
| WO 95/11473 | 4/1995 | (WO) | G02B/27/00 |
| WO 97/22033 | 6/1997 | (WO) | G02B/27/22 |

OTHER PUBLICATIONS

J. Neff, "Two–Dimensional Spatial Light Modulators: A Tutorial", Proceedings of the IEEE, vol. 78, No. 5, pp. 826–855, May, 1990.

Gerhard–Multhaupt, "Viscoelastic Spatial Light Modulators and Schlieren–Optical Systems for HDTV Projection Displays", SPIE vol. 1255 Large Screen Projection Displays II, pp. 69–78, 1990.

Gerhard–Multhaupt, "Light–Valve Technologies for High–Definition Television Projection Displays", Displays, vol. 12, No. 3/4, pp. 115–128, 1991.

Alvelda et al., "Ferroelectric Microdisplays Using Distortion–Compensated Pixel Layouts," SID 95 Digest, pp. 931–933, 1995.

Phillip Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, 1993.

Farn et al., "Color Separation by use of Binary Optics," Optics Letters, vol. 18:15, pp. 1214–1216, 1993.

Phillip Alvelda, "VLSI Microdisplays and Optoelectric Technology," MIT, pp. 1–93, 1995.

Phillip Alvelda, "VLSI Microdisplay Technology," Oct. 14, 1994.

F. Sandejas, R. Apte, W. Banyai, D. Bloom, "Surface Microfabrication of Deformable Grating Light Valves For High Resolution Displays," The 7th International Conference on Solid–State Sensors and Actuators, pp. 6 & 7, (no date).

O.Solgaard, F. Sandejas, and D. Bloom, "Deformable Grating Optical Modulator," Optics letters, vol. 17, No. 9, New York, USA, pp. 688–690, May 1, 1992.

Rowe, D.P. et al., "Laser Beam Scanning," SPIE, vol. 2088, Oct. 5, 1993, pp 18–26.

Hornbeck. L.J., "Deformable–Mirror Spatial Light Modulators," Spatial Light Modulators and Applications III, Aug. 8, 1989, pp 86–102.

Russick et al., "Supercritical Carbon Dioxide Extraction of Solvent from Micromachined Structures," Supercritical Fluids, Chapter 18, pp 255–269, 1997.

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

* cited by examiner

STEREO HEAD MOUNTED DISPLAY USING A SINGLE DISPLAY DEVICE

FIELD OF THE INVENTION

This invention relates to the field of personal display devices. More particularly, this invention is directed toward a portable head mounted display using a single display device that displays animated images in either a three-dimensional stereo perspective or a non-stereo mode.

BACKGROUND OF THE INVENTION

People with typical eyesight perceive depth of field while viewing three dimensional objects. They also rely on their depth of field perception when they undertake ordinary, commonplace activities such as driving a car, walking down the street, and playing sports. Most people closely associate their ability to perceive depth with reality. However, the majority of computer images, digitally generated images, movies and television programs are viewed as a series of two-dimensional images. While viewing computer images, digitally generated images, movies and television programs in two dimensions, the audience does not experience a realistic three-dimensional, stereoscopic perspective. Viewing movies and television programs in this three-dimensional perspective gives the viewer an additional element of reality.

For a person with normal eyesight, perceiving depth of field is achieved by close interactions between the person's nerve endings, brain, and eyes. When viewing an object, the right eye perceives a slightly different image than the left eye. This slightly different image between the right eye and left eye is normal because the right and left eyes reside in different locations relative to the object being viewed. The nerve endings of each eye perceive the right image and left image of the right and left eye, respectively. The nerve endings then transmit these images to the brain. The brain utilizes both the right and left images to produce a depth of field or stereoscopic perspective for the person viewing the object. These interactions occur very rapidly and appear naturally to the viewer.

There are numerous prior devices that attempt to provide viewers with a stereoscopic perspective while viewing a two-dimensional image. For example, U.S. Pat. Nos. 3,802,769 and 4,012,116 both only provide a stereo-effect image for still images. Further, both of these references require the viewers to be located at a center location relative to each device in order to experience the stereo-effect image. Accordingly, since each device is not attached to the viewer, these devices fail to provide the viewer with the stereo-effect image, once the viewer changes position such that the viewer is no longer aligned with the center of the device; it is unreasonable to expect an average viewer to remain motionless so that these types of applications are only temporarily effective. In addition, these devices taught by U.S. Pat. Nos. 3,802,769 and 4,012,116, only display still images. As a result, these devices have very limited applications.

Other stereoscopic viewers utilize polarizing filters to display right and left images to each corresponding eye of the user. For example, U.S. Pat. Nos. 4,623,219, 4,719,507, and 4,744,633, teach the use of polarizing filters to display stereoscopic, animated images. In these references, one image is modulated by linearly polarized high intensity light. The other image is modulated by an orthogonally disposed component of the above linearly polarized high intensity light. The viewers wear polarized glasses to allow each eye to view the respective left and right images. These systems suffer the drawback of only being effective for three-dimensional viewing when the image has been specially encoded for left and right images. Further, the use of these polarizing filters decreases the efficiency of the system because a portion of the light waves are lost in the decoding process. This decrease in efficiency results in images that lack the more vivid qualities of unfiltered images.

Three-dimensional glasses, with one red lens and one blue lens, are also very well known. Similar to the polarizing filters discussed above, this technique utilizes color filter so that one image is modulated by blue light waves and the other image is modulated by red light waves. This suffers similar drawbacks of the polarizing filters described above which include the need to encode a left image and a right image and the loss in efficiency because the left and right images need to be decoded. Further, because of the colored lenses, the viewer cannot perceive natural, balanced colors.

Some stereo viewing devices use two full displays. One display is provided for each of the user's eyes. Each of the display is provided with the appropriate data for forming the image that would naturally be seen by that one of the user's eye. Such a system adds cost due to duplication of display and light sources. Additionally, it has been observed that errors in registration between the displays, errors in focus, color and update rates of the two displays relative to one another can disorient or nauseate a user.

What is needed in a low cost method and apparatus of producing appropriate stereo images for a user's left and right eyes which are uniform and eliminates optical errors. What is needed is a device which displays three-dimensional stereoscopic images from a two-dimensional image source. What is further needed is a device which allows the user to view three-dimensional stereoscopic images without utilizing filters and while allowing the user to move freely. What is further needed is a device that does not expose the viewer to potentially harmful radiation from a cathode ray tube.

SUMMARY OF THE INVENTION

The present invention utilizes a single display to produce both a left image and a right image. The right image is directed to a right eye of the user, and the left image is directed to the left eye of the user. When in the stereoscopic mode, the right and left images differ from each other such that when viewed by the user, the combined right and left images give the user a stereoscopic, three-dimensional effect. When in non-stereoscopic, two-dimensional mode, the right and left images are the same. By providing the same images to the right and left eyes, the present invention provides the viewer with an image which appears brighter.

The present invention has many advantages over the prior devices by using a head mounted display. When worn on the head of the user, the present invention is properly aligned to provide the right image to the right eye and the left image to the left eye. Further, as the user moves, the present invention remains properly aligned such that the user can continue viewing the right image with the right eye and the left image with the left eye independent of movement by the user so long as the user keeps wearing the present invention.

The present invention also utilizes a single display which comprises a plurality of grating light valves. For example, both left and right light sources are directed to the display. The grating light valve receives the light from the left light source as the right image and selectively directs the light to the user's right eye. Similarly, the grating light valve receives light from the right light source as the left image and selectively directs the light to the user's left eye. The modulation of light by the grating light valve is configured to be accomplished sequentially and also sufficiently fast to multiplex both complete right and left images in a single time frame thereby preventing flicker. By using only one display, the present invention is inherently aligned to produce an accurate right and left images viewed by each respective eye without internal adjustments. Further, by using the grating light valve, the user is only exposed to either diffracted or reflected light. The present invention avoids exposing the user to harmful radiation such as from a cathode ray tube. Additionally, the grating light valve creates two images without the use of any filters. Further, by using frame sequential color and line sequential color with the single display, ftill color images are produced without flicker.

DETAILED DESCRIPTION OF THE PRESENT INVENTION

The present invention utilizes a single display to produce a series of left and right images. When in a non-stereo mode, a right image and a corresponding left image are configured to be the same such that the viewer receives a brighter image. When in stereoscopic mode, the right image and corresponding left image are configured to differ such that the viewer perceives a three-dimensional image from a two-dimensional image source. When the series of right images along with the corresponding series of left images are viewed, the present invention is preferably configured such that the series of left and right images appear animated.

The present invention utilizes a display comprising a plurality of pixels, each formed of a grating light valve (GLV). The inventors of the present invention have learned that operation of GLVs is generally considerably faster that other convention display elements. By utilizing GLVs, the present invention produces both right and left images with only one display without any flicker. Further, the right and left images have the ability to be shown in color.

By utilizing only a single display, the present invention can be made lighter in weight than a system that uses two displays and is thus, preferably configured to be portable and also worn by the user as a headset. Having only a single display apparatus which is alternately used to display an image to each eye is also less expensive to manufacture. Once the user wears the present invention, the user is preferably automatically aligned such that the user's right eye is aligned to receive the right image and the user's left eye is aligned to receive the left image. Additionally, as the user moves, the present invention will remain properly aligned with the user so long as the user continues to wear the present invention.

Figure 1:
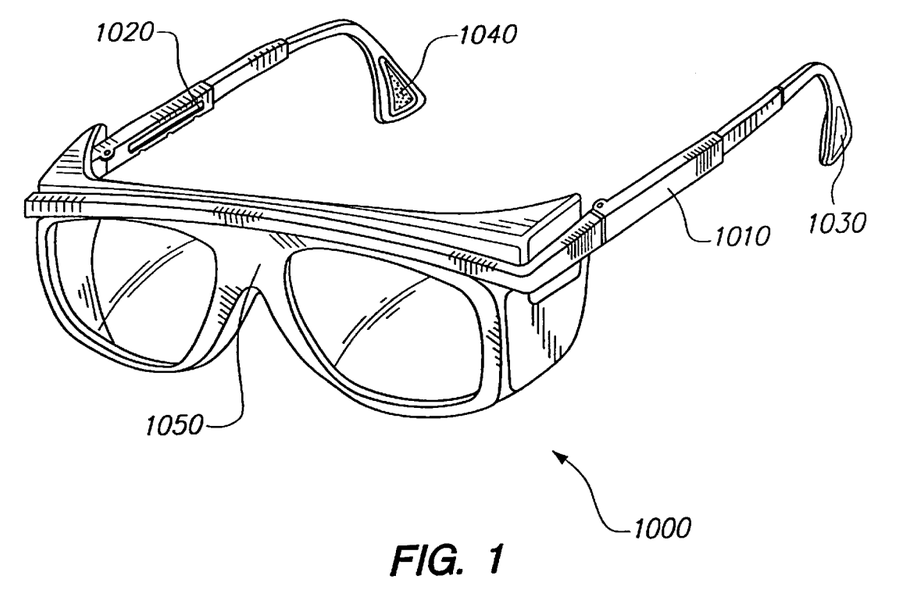
FIG. 1 illustrates a perspective view of the present invention.

FIG. 1 illustrates an exterior view of the present invention. The present invention is shown as a headset device 1000. The headset device has a main body 1050, a left arm 1010, a right arm 1020, a left earpiece 1030, and a right earpiece 1040. The main body 1050 preferably houses electronic and optical elements of the present invention. The left arm 1010 and the right arm 1020 are coupled to the main body 1050. The left and right arms 1010 and 1020 can be coupled rigidly or hingedly. Additionally, the left earpiece 1030 is coupled to the left arm 1010, and the right earpiece 1040 is coupled to the right arm 1020. The earpieces could also be configured to include miniature speaker elements for providing sound to the user, as well as visual images. The headset device 1000 is configured to be easily worn and utilized by the user. Preferably, in use, the left earpiece 1030 and the right earpiece 1040 help the headset device 1000 remain resting over the user's left and right ear, respectively, and the nose bridge of the main body remains on the user's nose. The headset 1000 in FIG. 1 is for exemplary purposes only. It would be apparent to a person skilled in the art to substitute the headset 1000 for other portable devices which are worn over the eyes of the user such as goggles, face shields, masks, and the like.

Figure 2:
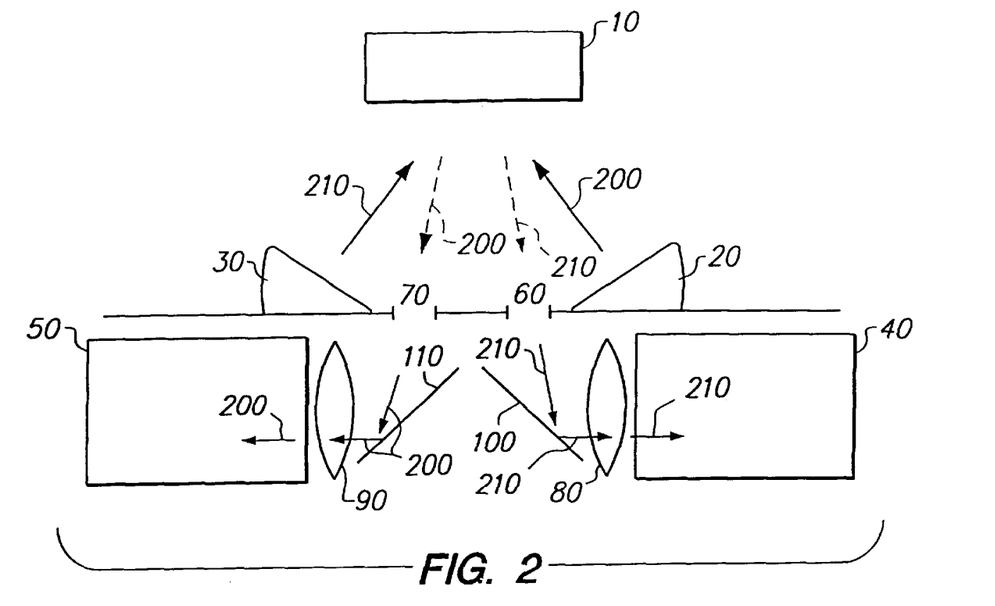
FIG. 2 illustrates a schematic front view of the present invention with a two dimensional array grating light valve.

FIG. 2 illustrates a schematic front view of a first embodiment of the present invention. Preferably, the display 10 is formed by a two dimensional array of GLVs. By utilizing a two dimensional array of grating light valves, this display 10 is preferably sized to display an entire image at once. A right light source 20 and a left light source 30 shine directed light onto the display 10 from different angles. It should be appreciated that the two-dimensional array could be replaced by a linear array and a scanning mirror such as disclosed in the commonly owned U.S. Pat. No. 5,982,553 entitled Display Device Incorporating One-Dimensional Grating Light-Valve Array issued on Nov. 9, 1999, and filed on Mar. 20, 1997, which is incorporated herein by reference. This embodiment is described below as an alternate embodiment.

The display 10 produces a right display for the user's right eye and a left display for the user's left eye. Preferably, the display 10 selectively diffracts light from the right light source 20 to the user's left eye thereby forming the left image. Similarly, the display 10 selectively diffracts light from the left light source 30 to the user's right eye thereby forming the right image. For the single display 10 to produce both right and left images, the display 10 alternates between producing the right and left images. Preferably, the display 10 utilizes a time sharing scheme to effectively produce both the right and left images on a single display while eliminating any flicker. Because GLVs can operate significantly faster than other conventional display elements, the display 10 preferably switches between the right and left images quickly enough to produce both the right and left images within the period of time it takes to display a present right image and a corresponding, subsequent right image.

As stated above, the display 10 preferably comprises a plurality of pixels each formed of a GLV arranged in a two dimensional array. Each pixel in this display 10, preferably has an "on" and "off" modes of operation and alternately represents a pixel of the right image and the left image. The display 10 selectively diffracts light from the right light source 20 and the left light source 30 on a pixel by pixel basis to form a left and right image, respectively.

For example, when a pixel is in the "on" mode and is producing the right image, the associated GLV diffracts the directed light from this pixel to the user's right eye to create an illuminated pixel at the location of this display for this particular right image. Likewise, when a pixel is in the "off" mode and is also producing the right image, the associated GLV reflects the directed light from this pixel away from both the user's eyes, such that the particular pixel that this GLV represents in the right image is dark.

Unlike a conventional cathode ray tube displays, a pixel of the display 10 comprises a GLV that preferably alternately represents distinct pixels of two separate images: the left image and the right image. Each GLV alternately acts as a pixel of a right image and another pixel of a left image. In use, the GLV alternates between functioning as a pixel for the right image and a pixel for the left image. The display 10 preferably contains a sufficiently high density of pixels to produce an image with sufficient resolution.

Preferably, each of the light sources 20 and 30 has a red, green, and blue light components to produce a balanced color image. Further, the light sources 20 and 30 preferably comprise red, green, and blue light emitting diodes.

In use, a labeled light ray 200 is traced from the formation of the light ray 200 at the right light source 20 to its destination at the user's left eye. It will be appreciated by persons of ordinary skill in the art that the angles and sizes shown in the drawing for the light rays, optical elements and the like are exaggerated to allow the drawings to be of a scale to fit onto an ordinary sheet of paper. This exaggeration is used as an aid to understanding the invention and should not be construed as somehow limiting the scope of this patent.

The light ray 200 begins at the right light source 20 and is directed onto the display 10. Conventional LEDs include an integrally formed lens element to direct the light. In certain circumstances, additional lensing may be desired. Then, within the display 10 a GLV at each pixel controls whether the light ray 200 is diffracted so that it reaches the user's left eye or is reflected away. If the light ray 200 is diffracted to the user's left eye, then the user views the light ray 200 as an illuminated pixel on the display 10. Otherwise, the user's left eye views the area of the display occupied by the light ray 200 as a darkened pixel.

If the light ray 200 is indeed seen by the user's left eye, then the light ray 200 is diffracted from the display 10 through a slit 70 and then reflects off of a first left turning mirror 110. After reflecting from the first left mirror 110, the light ray 200 is then focused for presentation to the user's eye through a first left lens 90. As a last step, the light ray 200 reflects off a second left turning mirror 50, and the light ray 200 finally can be seen by the user's left eye.

Similar to the light ray 200, a labeled light ray 210 is traced from the creation of the light ray 210 at the left light source 30 to its destination at the user's right eye. The light ray 210 begins at the left light source 30 and is directed onto the display 10, preferably through the integrally formed LED lenses. Then, within the display 10 each pixel's GLV controls whether the light ray 210 reaches the user's right eye or is reflected away from the right eye. If the light ray 210 is diffracted to the user's right eye, then the user views the light ray 210 as an illuminated pixel on the display 10. Otherwise, the user's left eye views the area of the display occupied by the light ray 210 as a darkened pixel.

If the light ray 210 is indeed seen by the user's right eye, then the light ray 210 is diffracted from the display 10 through a slit 60 and then reflects off of a first right turning mirror 100. After reflecting from the first right mirror 100, the light ray 210 is then focused through a first right lens 80. As a last step, the light ray 210 reflects off a second right turning mirror 40, and the light ray 210 finally can be seen by the user's right eye.

The light rays 200 and 210 are shown as exemplary light paths. It is apparent to a person with ordinary skill in the art that multiple light rays presented throughout a solid angle are needed to form a complete right image and left image.

Figure 3:
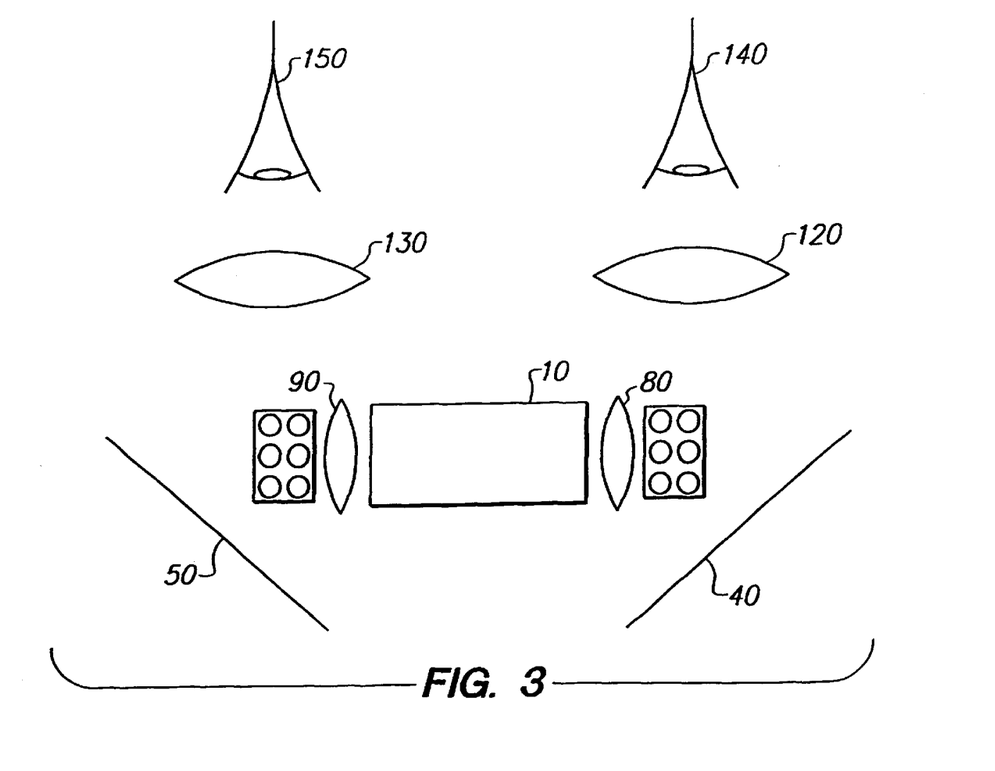
FIG. 3 illustrates a top view of the present invention as described in FIG. 2.

FIG. 3 illustrates a side view of the preferred embodiment. Many of the elements in FIG. 3 share the same reference numerals with the elements found in FIG. 2. In addition to the common elements found in FIG. 2, the light rays reflecting off the second right mirror 40 pass through a final right focussing lens 120 before being seen by the user's right eye 140. Similarly, the light rays reflecting from the second left mirror 50 pass through a final left focussing lens 130 before being seen by the user's left eye 150. Under certain circumstances, the lenses 120 and 130 can be eliminated. The user's right eye 140 and left eye 150 are shown for illustrative purposes and accordingly are not part of the present invention.

Figure 4:
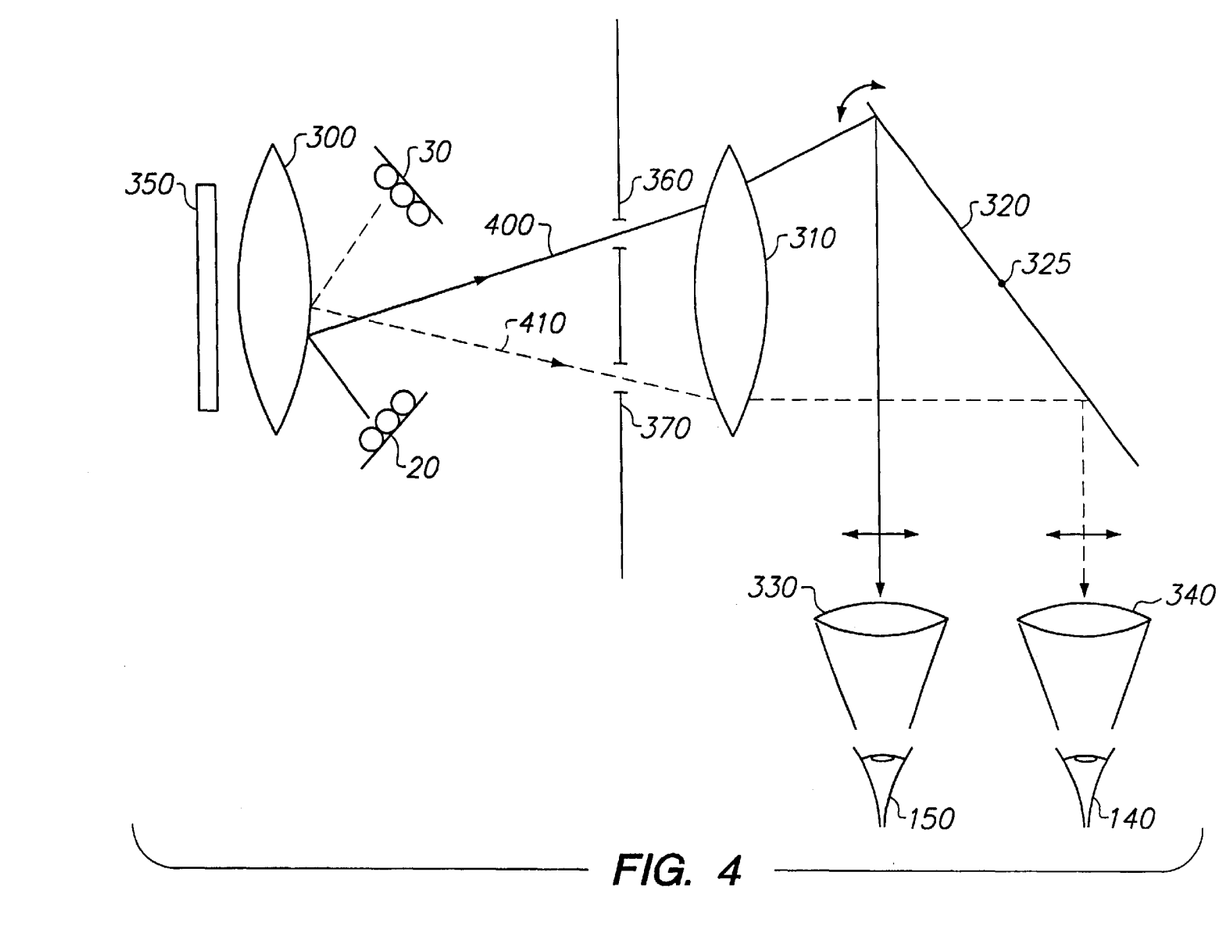
FIG. 4 illustrates a top view of the present invention with a one dimensional array grating light valve.

FIG. 4 illustrates a second embodiment of the present invention. For the sake of simplicity and clarity, shared reference numerals are used for common elements found in FIGS. 1 and 2 such as the right light source 20, the left light source 30, the user's right eye 140, and the user's left eye 150.

The second embodiment utilizes a one dimensional display 350 which preferably comprises a one dimensional array of pixels each formed of a GLV. By utilizing a one dimensional array of pixels this display 350 is preferably utilized in conjunction with a scanning mirror 320 in order to display a complete image. The advantages of utilizing a one dimensional array of pixels as the display in this second embodiment instead of a two dimensional array of pixels includes: lower manufacturing costs of the display and more compact package size of the display. Similar to the first embodiment as illustrated in FIGS. 1 and 2, in this second embodiment, the right light source 20 and the left light source 30 shine directed light onto the display 350 from different angles.

Similar to the display 10, the one dimensional display 350 produces a right display for the user's right eye and a left display for the user's left eye. Preferably, the display 350 selectively reflects light from the right light source 20 to the user's left eye 150 thereby forming the left image. Similarly, the display 350 selectively reflects light from the left light source 30 to the user's right eye 140 thereby forming the right image.

However, the one dimensional display 350 cannot fully display the right and left image without the scanning mirror 320. By itself, the one dimensional display 350 preferably displays only a partial right image and a partial left image at one given time. Preferably, the scanning mirror 320 rotates around an axis 325 such that the scanning mirror 320 reflects a plurality of partial right and left images within the time needed by the user's right and left eyes to view a single image. Further, the plurality of partial right images and the plurality of partial left images are combined, the resulting right image is preferably a complete right image, and the resulting left image is preferably a complete left image. Preferably, the scanning mirror 320 in conjunction with the one dimensional display 350 give the user's right and left eyes the perception of complete, flicker-free right and left images, respectively. For example, when the scanning mirror 320 directs light rays towards either eye, the scanning mirror 320 is prescribed a specified range of rotation about the axis 325 in order to give the user a complete image from the one dimensional array of pixel which comprise the display 350. As is known, the scanning mirror can be a vibrational scanning mirror, scanning back and forth across the eye, or a rotational scanning mirror scanning across the eye in one direction and then scanning with the mirror around a faceted cylindrical mirror.

For the display 350 to produce both a portion of the right and left images, the display 350 alternates between producing the portions of the right and left images. Preferably, the display 350 utilizes a time sharing scheme to effectively produce both portions of the right and left images on the display 350 while eliminating any perceivable flicker. This is achievable in part owing to the operational speed of GLV elements which operate significantly faster than conventional display elements. The display 350 preferably switches between portions of the right and left images quickly enough to produce both the portions of the right and left images within a period of time needed to display a present right image and a corresponding, subsequent right image.

Each pixel in this display 350, preferably is either in an "on" or "off" mode of operation. Further, at one given time, each pixel represents a small portion of either the right image or the left image. For example, when a pixel is in the "on" mode and is producing the right image, this pixel reflects the directed light from this pixel to the user's right eye to create an illuminated pixel at a particular location for this GLV for this particular right image. Likewise, when a pixel is in the "off" mode and is also producing the right image, this pixel diffracts the directed light from this pixel away from the user's right eye, such that the particular pixel of the right image that the pixel represents is dark.

In use, a labeled light ray 400 is seen originating from the right light source 20 and terminating at the user's left eye 150. It is apparent to a person with ordinary skill in the art that multiple light rays presented throughout a solid angle are needed to form a complete right image and left image. It will be appreciated by persons of ordinary skill in the art that the angles and sizes shown in the drawing for the light rays, optical elements and the like are exaggerated to allow the drawings to be of a scale to fit onto an ordinary sheet of paper.

First, the light ray 400 begins from the right light source 20 and passes through the first lens 300 towards the display 350. The first lens 300 directs the light ray 400 to a particular pixel within the display 350. If this particular pixel is operating in an "off" mode, the light ray 400 would be reflected by the pixel to an absorbing stop. However, in this particular example, the pixel is shown to be operating in the "on" mode. Therefore, the light ray 400 is diffracted from the pixel of the display 350 back through the first lens 300 and the first slit 360. Next, the light ray 400 preferably passes through a second lens 310 and is focussed onto the scanning mirror 320. The scanning mirror 320 reflects the light ray 400 through a third lens 330 such that the user's left eye 150 can view the light ray 400. The lens 330 allows a designer to reduce the size of the scan mirror. The system can be designed to provide a focus point for the eye at infinity. This provides the user with the most comfort for viewing.

Similar to the light ray 400, a light ray 410 can be seen originating from the left light source 30 and terminating at the user's right eye 140. First, the light ray 410 begins from the left light source 30 and passes through the first lens 300 towards the display 350. The first lens 300 directs the light ray 410 to a particular pixel within the display 350. If this particular pixel is operating in an "off" mode, the light ray 410 would be reflected by the pixel to an absorbing stop. However, in this particular example, the GLV is shown to be operating in the "on" mode. Therefore, the light ray 410 is diffracted from the GLV of one of the pixels of the display 350 back through the first lens 300 and the second slit 370. Next, the light ray 410 preferably passes through a second lens 310 and is focussed onto the scanning mirror 320. The scanning mirror 320 reflects the light ray 410 through a third lens 340 such that the user's right eye 140 can view the light ray 410. The lens 340 allows a designer to reduce the size of the scan mirror. The system can be designed to provide a focus point for the eye at infinity. This typically provides the user with the most comfort for viewing.

The use of a scan mirror in a configuration such as shown in FIG. 4 can be used to provide a wide field of view. The scan mirror can be moved to present an image across a wider field relative to the eye. This can provide a panoramic view of an image, the further the scan mirror sweeps, the more panoramic the view presented. The scope of the field of view is particularly important to immersive displays. In an immersive display the user is presented with an image that appears to surround the user.

The light rays 200 and 210 are shown as exemplary light paths. It is apparent to a person with ordinary skill in the art that multiple light rays form a complete right image and left image. Further, by utilizing the display 350 and the scanning mirror 320 combined with these multiple light rays, complete right and left images are capable of being displayed.

Figure 5:
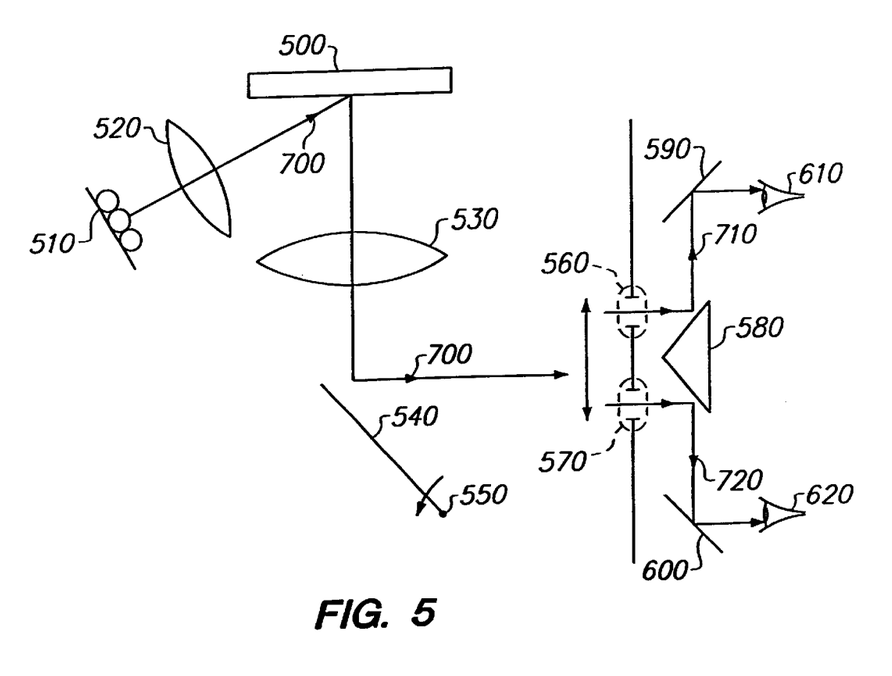
FIG. 5 illustrates a top view of the present invention with a one dimensional array grating light valve and a single light source.

FIG. 5 illustrates a third embodiment of the present invention. This third embodiment utilizes a display 500, a single light source 510, a first lens 520, a second lens 530, a scanning mirror 540, a right slit 560, a left slit 570, a prism 580, a right mirror 590, and a left mirror 600. Similar to the second embodiment, by utilizing a one-dimensional array of pixels each formed from a GLV, this display 500 is preferably utilized in conjunction with the scanning mirror 540 in order to display a complete image. As stated previously, the advantages of utilizing a one-dimensional array of GLVs as the display in this third embodiment instead of a two-dimensional array of GLVs includes: lower manufacturing costs of the display and more compact package size of the display. The single light source 510 preferably comprises a red, green, and blue light components to produce a balanced color image. Further, the light sources 510 are preferably red, green, and blue light emitting diodes.

Similar to the display 350, the one-dimensional display 500 produces a right display for the user's right eye and a left display for the user's left eye. Unlike the first and second embodiments, this third embodiment relies on only the single light source 510 to illuminate the display 500 in order to create both the right and left images for a right eye 610 and a left eye 620, respectively. However, the one dimensional display 500 cannot fully display the right and left image without the scanning mirror 540. By itself, the one dimensional display 510 preferably displays only a partial right image and a partial left image at one given time. Preferably, the scanning mirror 540 rotates around an axis 550 such that the scanning mirror 540 reflects a plurality of partial right and left images within the allotted time needed by the user's right and left eyes to view a single image. Further, the plurality of partial right images and the plurality of partial left images are combined, the resulting right image is preferably a complete right image, and the resulting left image is preferably a complete left image. Preferably, the scanning mirror 540 in conjunction with the one-dimensional display 500 give the user's right and left eyes the perception of complete, flicker-free right and left images, respectively. It will be apparent to persons of ordinary skill in the art that exit lenses can be provided such as lenses 330 and 340 in FIG. 4. The exit lens allows a designer to reduce the size of the scan mirror. The system can be designed to provide a focus point for the eye at infinity. This typically provides the user with the most comfort for viewing.

For the display 500 to produce both a portion of the right and left images, the display 500 alternates between producing the portions of the right and left images. Preferably, the display 500 utilizes a time sharing scheme to effectively produce both portions of the right and left images on the display 350 while eliminating any perceivable flicker. The display 350 preferably switches between portions of the right and left images quickly enough to produce both the portions of the right and left images within a period of time needed to display a present right image and a corresponding, subsequent right image.

In use, a labeled light ray 700 is seen originating from the single light source 510. It is apparent to a person with ordinary skill in the art that multiple light rays presented throughout a solid angle are needed to form a complete right image and left image. It will be appreciated by persons of ordinary skill in the art that the angles and sizes shown in the drawing for the light rays, optical elements and the like are exaggerated to allow the drawings to be of a scale to fit onto an ordinary sheet of paper. The light ray 700 passes through the first lens 520 towards the display 500. The first lens 520 directs the light ray 700 to a particular pixel within the display 500. If this particular pixel is operating in an "off" mode, the light ray 700 would terminate at the pixel. However, in this particular example, the pixel is shown to be operating in the "on" mode. Therefore, the light ray 700 is reflected from the pixel of the display 350 through the second lens 530 and toward the scanning mirror 540.

Next, depending on the position of the scanning mirror 540, the light ray 700 is either directed towards the right eye 610 or the left eye 620. Further, when the scanning mirror 540 directs the light ray 700 towards either eye, the scanning mirror 540 is prescribed a specified range of rotation in order to give the user a complete image from the one dimensional array of pixels which comprise the display 500.

When the scanning mirror 540 directs the light ray 700 towards the right eye 610, the light ray 700 passes through the first slit 560 and is labeled as a light ray 710 in FIG. 4. The light ray 710 impinges on the prism 580 and is reflected onto the right mirror 590. Then the right mirror 590 reflects the light ray 710 to the right eye 610.

When the scanning mirror 540 directs the light ray 700 towards the left eye 620, the light ray 700 passes through the second slit 570 and is labeled as a light ray 720 in FIG. 4. The light ray 720 impinges on the prism 580 and is reflected onto the left mirror 600. Then the left mirror 600 reflects the light ray 720 to the left eye 620.

The present invention utilizes several methods to produce full color images. In the first embodiment as shown in FIGS. 2 and 3, it is preferable to utilize frame sequential color. For frame sequential color, a single color light element from a light source sequentially illuminates the display 10 for each frame that is viewed by the user. For example, when the first embodiment is displaying a right image to the user, the red, blue, and green light elements within the left light source 30 individually and sequentially illuminate the display 10 for the entire frame. In effect, this particular right image is drawn three times; one time for each color element. The individual pixels within the display 10 are preferably sufficiently fast to alternate between the left and right images while utilizing frame sequential color to produce full color images.

The second and third embodiments, as shown in FIGS. 4 and 5, preferably utilize either frame sequential color or line sequential color. When frame sequential color is utilized by the second and third embodiments, single color light elements (red, green, and blue) from a light source each sequentially illuminates the display. Each of the single color light elements takes turns illuminating the display for the entire frame. For example, when a right image is being displayed, the display comprising the one dimensional array of pixels is individually and sequentially illuminated by a red, blue and green light for the entire frame. In effect, this particular right image is completely drawn three times; one time for each color element. In other words, the red light element illuminates the display until the entire right image is drawn. Then, this particular right image is drawn again two more times, once with the green light element and then once with the blue light element. The individual pixels within the display are preferably sufficiently fast to alternate between the left and right images while utilizing frame sequential color with the one-dimensional array of pixels to produce full color images.

Similar to frame sequential color, when the second and third embodiments utilize line sequential color, each light element (red, green, and blue lights) within the light source sequentially illuminates the display. However, in contrast to frame sequential color, for the line sequential color, each light element sequentially illuminates the display only for an entire line which is simultaneously displayed by the one-dimensional array of pixels. For example, when a right image is being displayed, the display is sequentially illuminated by each light element for an entire line. This entire line is simultaneously displayed by the one-dimensional array of pixels before the scanning mirror changes positions. As a result, each line of this particular right image is drawn three times before moving to the next line of the right image; each time the same line is drawn, a different light element illuminates the display. The individual pixels within the display are preferably sufficiently fast to alternate between the left and right images while utilizing line sequential color with the one-dimensional array of pixels to produce full color images.

It will be apparent that the delivery of the left and right images must be properly synchronized in time with the light sources, the delivery of data to the display elements and the scan mirror. The operation and characteristics of such a system are well known. A conventional microprocessor can be used to accomplish this task. Likewise a microcontroller, general purpose control circuit or even a special purpose display control circuit can be utilized to generate such control.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation.

In the claims:

1. A headset for viewing a two dimensional image comprising:
   a. means for attaching the headset to a user;
   b. a right light source and a left light source wherein each light source provides a directed light; and
   c. a display comprising a diffractive light modulator for receiving the directed light from the right and left light sources whereby the display alternates between forming a left image and a right image, respectively, such that in operation the left image is directed to a left eye of the user and further such that the right image is directed to a right eye of the user.

2. The headset as claimed in claim 1 wherein each of the right and left light sources further comprises red, blue, and green light emitting diodes.

3. The headset as claimed in claim 1:
   a. wherein the diffractive light modulator comprises a one dimensional array of grating light valves for producing a portion of the right and left images; and
   b. further comprising a scanning mirror for reflecting the portion of the right and left images produced by the one dimensional array of grating light valves such that the right and left images can be fully viewed in their entirety.

4. The headset as claimed in claim 1 wherein the diffractive light modulator comprises a two dimensional array of grating light valves wherein each grating light valve forms a pixel of the display.

5. The headset as claimed in claim 1 wherein the right image and the left image differ such that viewing the right image with the right eye and the left image with the left eye produces a three dimensional, stereoscopic visual effect from the right and left images.

6. The headset as claimed in claim 1 wherein the right image and the left image are identical such that viewing the right image with the right eye and the left image with the left eye produces a mono effect such that the mono effect is substantially brighter compared to viewing only a single image.

7. A headset for viewing a two dimensional image comprising:
   a. a display comprising a plurality of grating light valves;
   b. means for illuminating the display;
   c. means for forming a right image and a left image on the display by the plurality of grating light valves selectively reflecting light from the means for illuminating, the display alternating between forming the right image and the left image; and
   d. means for directing the right image to a right eye of a user and the left image to a left eye of the user wherein the right and left eyes remain properly aligned to receive a corresponding image while allowing the user to move.

8. The headset as claimed in claim 7 wherein the plurality of grating light valves is configured as a two dimensional array wherein each light valves represents a pixel of the display.

9. The headset as claimed in claim 7 wherein the means for illuminating includes red, green, and blue light emitting diodes.

10. The headset as claimed in claim 7 wherein the right image and the left image differ such that the user views a three dimensional, stereoscopic effect from the right and left images.

11. The headset as claimed in claim 7 wherein the right image and the left image are the same such that to the user, the two dimensional image appears twice as bright.

12. The headset as claimed in claim 7 wherein the means for illuminating includes a right light source and a left light source wherein the right and left light sources illuminate the display for the left and right images, respectively.

13. The headset as claimed in claim 12 wherein each of the right and left light sources includes red, green, and blue light sources.

14. The headset as claimed in claim 13 further comprising means for sequentially cycling only once through each red, green, and blue light source of the right light source for each right image while simultaneously sequentially cycling only once through each red, green, and blue light source of the left light source for each left image such that the right and left images appear in color.

15. A headset for viewing a two dimensional image comprising:
   a. a display comprising a one dimensional array of a plurality of grating light valves;
   b. means for illuminating the display;
   c. means for forming a partial right image and a partial left image on the display by the plurality of grating light valves selectively reflecting light from the means for illuminating, the display alternating between forming the partial right image and the partial left image;
   d. means for rotating a mirror to form a full right image and a full left image such that the partial right and left images produce the full right and full left images, respectively; and
   e. means for reflecting the full right image to a right eye of a user and the full left image to a left eye of a user such that the right and left eyes remain properly aligned to receive a corresponding image while the user is wearing the headset.

16. The headset as claimed in claim 15 wherein the full right image and the full left image differ such that the user views a three dimensional, stereoscopic effect from viewing the full right and left images.

17. The headset as claimed in claim 15 wherein the full right image and the full left image are the same such that the two dimensional image appears twice as bright to the user.

18. The headset as claimed in claim 15 wherein the means for illuminating is a right light source and a left light source wherein the right and left light sources illuminate the display to produce the left and right images, respectively.

19. The headset as claimed in claim 18 wherein each of the right and left light sources includes red, green, and blue light sources.

20. The headset as claimed in claim 19 further comprising means for sequentially cycling only once through each red, green, and blue light source of the left light source for each full right image while simultaneously cycling only once through each red, green, and blue light source of the right light source for each full left image such that the full right and left images appear in color.

21. The headset as claimed in claim 19 further comprising means for sequentially cycling only once through each red, green, and blue light source of the left light source for each partial right image while simultaneously cycling only once through each red, green, and blue light source of the right light source for each partial left image such that the partial right and left images appear in color.

22. A method of viewing a two dimensional image with a stereoscopic effect through a headset comprising the steps of:
   a. directing a first light source and a second light source onto a display wherein the display comprises a plurality of grating light valves;

b. alternating between forming a right image and a left image on the display wherein the right image and the left image differ; and c. reflecting the right image to a right eye of a user and the left image to a left eye of the user wherein the right and left eyes remain properly aligned to receive a corresponding image while the user is wearing the headset such that the user is automatically aligned to view the stereoscopic effect.

23. The method as claimed in claim 22 wherein each of the first light and second light sources comprise a red light emitting diode, a green light emitting diode, and a blue light emitting diode.

24. The method as claimed in claim 22 wherein the plurality of grating light valves are configured in a two dimensional array wherein each grating light valve forms a pixel of the display.

25. A method of viewing a two dimensional image through a headset comprising the steps of:

a. directing a first light source and a second light source onto a display wherein the display comprises a plurality of grating light valves;

b. alternating between forming a right image and a left image on the display wherein the right image and the left image are the same; and c. reflecting the right image to a right eye of a user and the left image to a left eye of the user wherein the right and left eyes remain properly aligned to receive a corresponding image while the user is wearing the headset such that the user views the two dimensional image.

26. The method as claimed in claim 25 wherein each of the first and second light sources comprise a red light source, a blue light source, and a green light source.

27. The method as claimed in claim 26 further comprising the step of sequentially cycling only once through each red, blue, and green light source of the first light source for each right image and sequentially cycling only once through each red, blue, and green light source of the second light source for each left image such that the right and left images appear in color wherein the step of sequentially cycling is repeated to produce subsequent right and left images in color.

28. A method of displaying a two dimensional image with a stereoscopic effect through a headset worn by a user comprising the steps of:

a. directing a first light source and a second light source onto a one dimensional array of grating light valves;

b. alternating between forming a partial right image and a partial left image from the array of grating light valves by selectively reflecting each grating light valve in the array of grating light valves;

c. scanning the array of grating light valves with a movable mirror to create a complete right image and a complete left image wherein the complete right and complete left images differ; and d. reflecting the complete right image to a right eye of the user and the complete left image to a left eye of the user wherein the right and left eyes remain properly aligned to receive a corresponding image while the user is wearing the headset such that the user views the stereoscopic effect.

29. The method as claimed in claim 28 wherein the first and second light sources each comprise a red light source, a blue light source, and a green light source.

30. The method as claimed in claim 29 further comprising the step of sequentially cycling only once through the red, blue, and green light sources of the first light source for the partial right image and sequentially cycling only once through the red, blue, and green light sources of the second light source for the partial left image such that the array of grating light valves form the partial right and left images in color.

31. The method as claimed in claim 29 further comprising the step of sequentially cycling only once through each red, blue, and green light source of the first light source for each complete right image and sequentially cycling only once through each red, blue, and green light source of the second light source for each complete left image such that the array of grating light valves form the complete right and left images in color.

32. A headset for viewing a two dimensional image comprising:

a. means for attaching the headset to a user;

b. a first light source and a second light source, the first light source providing a first directed light and the second light source providing a second directed light;

c. a linear light modulator for receiving the first and second directed light, the linear light modulator alternating between forming a right image and a left image from the first and second directed light, respectively; and d. a scanning mirror for reflecting and scanning the right image and the left image such that a user views the right image with a right eye and further such that the user views the left image with a left eye.

33. The headset as claimed in claim 32 wherein each of the first and second light sources comprises red, green, and blue light emitting diodes.

34. The headset as claimed in claim 32 wherein the linear light modulator comprises a one dimensional array of grating light valves.

35. The headset as claimed in claim 32 wherein the right image and the left image differ such that viewing the right image with the right eye and viewing the left image with the left eye produces a three dimensional stereoscopic visual effect.

36. The headset as claimed in claim 32 wherein the right image and the left image are identical such that viewing the right image with the right eye and viewing the left image with the left eye produces a mono effect such that the mono effect is substantially brighter copared to viewing only a single image.

37. The headset as claimed in claim 32 wherein the linear light modulator sequentially produces the right image as a full right image and then produces the left image as a full left image.

38. The headset as claimed in claim 32 wherein the linear light modulator sequentially produces the right image as a partial right image and then produces the left images as a partial left image.

* * * * *